(12) United States Patent
Osada et al.

(10) Patent No.: US 9,279,436 B2
(45) Date of Patent: Mar. 8, 2016

(54) JOINT STRUCTURE FOR FIBER REINFORCED RESIN AND METAL

(71) Applicant: Fuji Jukogyo Kabushiki Kaisha, Tokyo (JP)

(72) Inventors: Tamotsu Osada, Tokyo (JP); Ayako Oide, Tokyo (JP); Takahiro Nagayama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 13/888,228

(22) Filed: May 6, 2013

(65) Prior Publication Data
US 2013/0322962 A1 Dec. 5, 2013

(30) Foreign Application Priority Data

May 31, 2012 (JP) .................. 2012-123895

(51) Int. Cl.
| | |
|---|---|
| *F16B 3/00* | (2006.01) |
| *B29C 37/00* | (2006.01) |
| *B29C 65/48* | (2006.01) |
| *B29C 65/56* | (2006.01) |
| *B29C 65/72* | (2006.01) |
| *B29C 65/00* | (2006.01) |
| *B29K 105/08* | (2006.01) |

(52) U.S. Cl.
CPC .............. *F16B 3/00* (2013.01); *B29C 37/0082* (2013.01); *B29C 65/48* (2013.01); *B29C 65/56* (2013.01); *B29C 65/72* (2013.01); *B29C 66/02* (2013.01); *B29C 66/0246* (2013.01); *B29C 66/12443* (2013.01); *B29C 66/30325* (2013.01); *B29C 66/43* (2013.01); *B29C 66/721* (2013.01); *B29C 66/742* (2013.01); *B29C 65/562* (2013.01); *B29C 66/1122* (2013.01); *B29C 66/21* (2013.01); *B29C 66/30321* (2013.01); *B29C 66/71* (2013.01); *B29C 66/7212* (2013.01); *B29C 66/72141* (2013.01); *B29C 66/7394* (2013.01); *B29C 66/7422* (2013.01); *B29K 2105/0872* (2013.01); *Y10T 403/7039* (2015.01)

(58) Field of Classification Search
USPC .......................................... 403/298, 361, 381
See application file for complete search history.

(56) References Cited

U.S. PATENT DOCUMENTS

| | | | | |
|---|---|---|---|---|
| 4,678,455 | A * | 7/1987 | Hollaway, Jr. .......... | B29C 70/20 474/263 |
| 6,176,959 | B1 * | 1/2001 | Clarke ........................ | 156/272.8 |
| 6,835,436 | B1 * | 12/2004 | Reif et al. ..................... | 428/119 |
| 7,118,647 | B2 * | 10/2006 | Cabell .................... | D21F 11/006 162/109 |
| 8,518,521 | B2 * | 8/2013 | Aso ...................... | B29C 45/0005 428/141 |
| 8,690,472 | B2 * | 4/2014 | Meyer et al. .................. | 403/283 |
| 2006/0163222 | A1 | 7/2006 | Dance et al. | |
| 2012/0027507 | A1 * | 2/2012 | Meyer et al. .................. | 403/291 |

FOREIGN PATENT DOCUMENTS

| | | |
|---|---|---|
| JP | 2006-501070 A | 1/2006 |
| WO | WO2004/028731 A1 | 4/2004 |

* cited by examiner

*Primary Examiner* — Victor MacArthur
(74) *Attorney, Agent, or Firm* — McGinn IP Law Group, PLLC

(57) ABSTRACT

There is provided a joint structure for a fiber reinforced resin and a metal. In the joint structure, respective end portions of a fiber reinforced plastic and a metallic material are joined to each other. A large number of projections having a height that enables the projections to contact fibers constituting the fiber reinforced plastic are formed on a joint surface of the metallic material serving as a part of a joint surface between the fiber reinforced plastic and the metallic material.

15 Claims, 6 Drawing Sheets

JOINT STRUCTURE FOR FIBER REINFORCED RESIN AND METAL

CROSS-REFERENCE TO RELATED APPLICATIONS

The present application claims priority from Japanese Patent Application No. 2012-123895, filed on May 31, 2012, the entire contents of which are hereby incorporated by reference.

BACKGROUND OF THE INVENTION

1. Field of the Invention

The present invention relates to a joint structure for a fiber reinforced resin and a metal.

2. Description of the Related Art

Fiber reinforced plastics (FRPs) are today used widely in structural members for aircraft, automobiles, ships, and general industrial instruments. For example, a known structural member is formed by impregnating a woven fabric, in which inorganic reinforcing fibers such as carbon fibers or glass fibers are arranged in a crisscross pattern and interwoven, with a resin such as epoxy resin, and then hardening the resin. In many cases, however, such structural members are not formed entirely from fiber reinforced plastics, and a metallic material must be applied partially thereto. In a known technique employed in such cases, as shown in FIG. 6, for example, a fastener joint is formed between a fiber reinforced plastic 100 and a metallic material 101 using a fastening tool 102 so that the fiber reinforced plastic 100 and the metallic material 101 are firmly integrated.

When the fastening tool 102 is attached, however, a current generated by lightning or electrification, for example, may cause spark discharge F in a projecting portion of the fastening tool 102, and therefore the fastening tool 102 is preferably not used.

In recent years, a technique of directly adhering a fiber reinforced plastic and a metallic material to ensure that the fiber reinforced plastic and the metallic material are joined with a high degree of strength has been proposed. In so doing, the fastening tool 102 may be omitted, and as a result, a reduction in weight and so on can be achieved. Further, a technique of forming projections on a metallic material side joint surface serving as part of a joint surface between the fiber reinforced plastic and the metallic material in order to improve the strength of the joint between the fiber reinforced plastic and the metallic material has been developed (see Japanese Unexamined Patent Application Publication (Translation of PCT Application) No. 2006-501070, for example).

With the joint structure using the fastening tool 102, however, an overall conductivity increases, and therefore a current generated by lightning or electrification can be expected to flow away smoothly, but when the fastening tool 102 is omitted, the conductivity inevitably decreases, and as a result, it may be impossible to remove the current smoothly.

SUMMARY OF THE INVENTION

The present invention has been designed in consideration of the circumstances described above, and an object thereof is to provide a joint structure for a fiber reinforced resin and a metal the structure being capable of securing an equivalent conductivity to that of a fastener joint without the use of a fastening tool.

To achieve the object described above, an aspect of the present invention provides a joint structure for a fiber reinforced resin and a metal, in which respective end portions of a fiber reinforced plastic and a metallic material are joined to each other. A large number of projections having a height that enables the projections to contact fibers constituting the fiber reinforced plastic are formed on a joint surface of the metallic material serving as a part of a joint surface between the fiber reinforced plastic and the metallic material.

Preferably, a plurality of grooves is formed around each of the projections to extend radially from a center of the projection, and the plurality of grooves curve in an identical direction.

DESCRIPTION OF THE PREFERRED EMBODIMENTS

An embodiment of the present invention will be described below with reference to the drawings. However, the present invention is not limited to the following embodiment.

Figure 1:
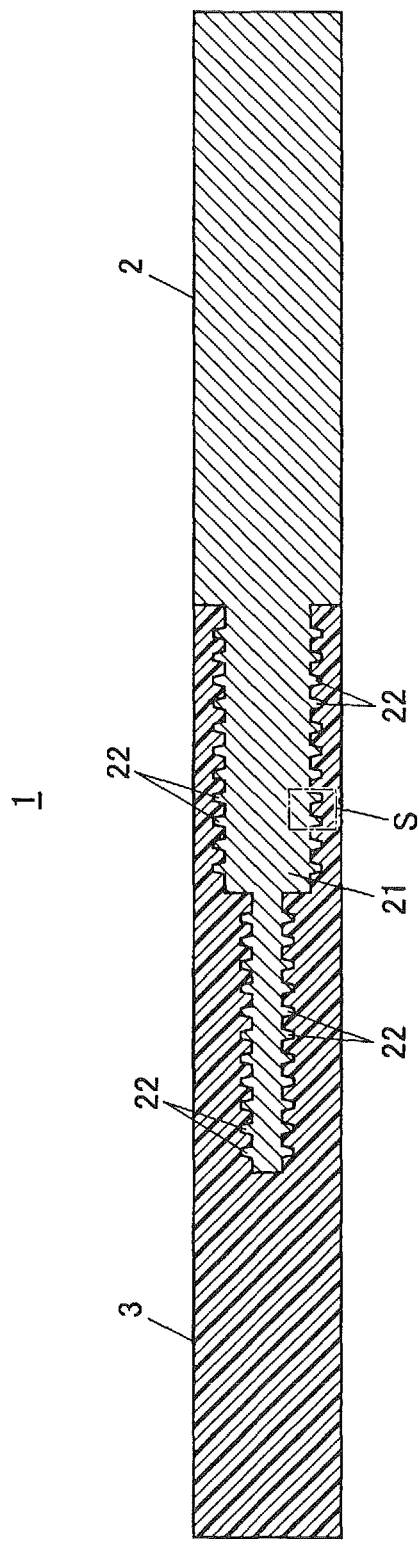
FIG. 1 is a sectional view of a joint structure for a fiber reinforced plastic and a metal according to an embodiment of the present invention.

FIG. 1 is a schematic sectional view showing a configuration of a joint structure 1 for a fiber reinforced resin and a metal according to this embodiment. As shown in FIG. 1, the joint structure 1 includes a metal portion 2 constituted by a metallic material such as titanium, for example, and a resin portion 3 constituted by a fiber reinforced plastic such as CFRP, for example.

An end portion 21 of the metal portion 2 includes a stepped structure that becomes thinner in steps in an end surface direction. In this embodiment, the stepped structure is formed to become thinner insteps in a vertical direction so that a central portion of the metal portion 2 in a thickness direction thereof is thinnest. A large number of projections 22 are formed on an upper surface and a lower surface of the end portion 21 having the stepped structure.

Figure 2:
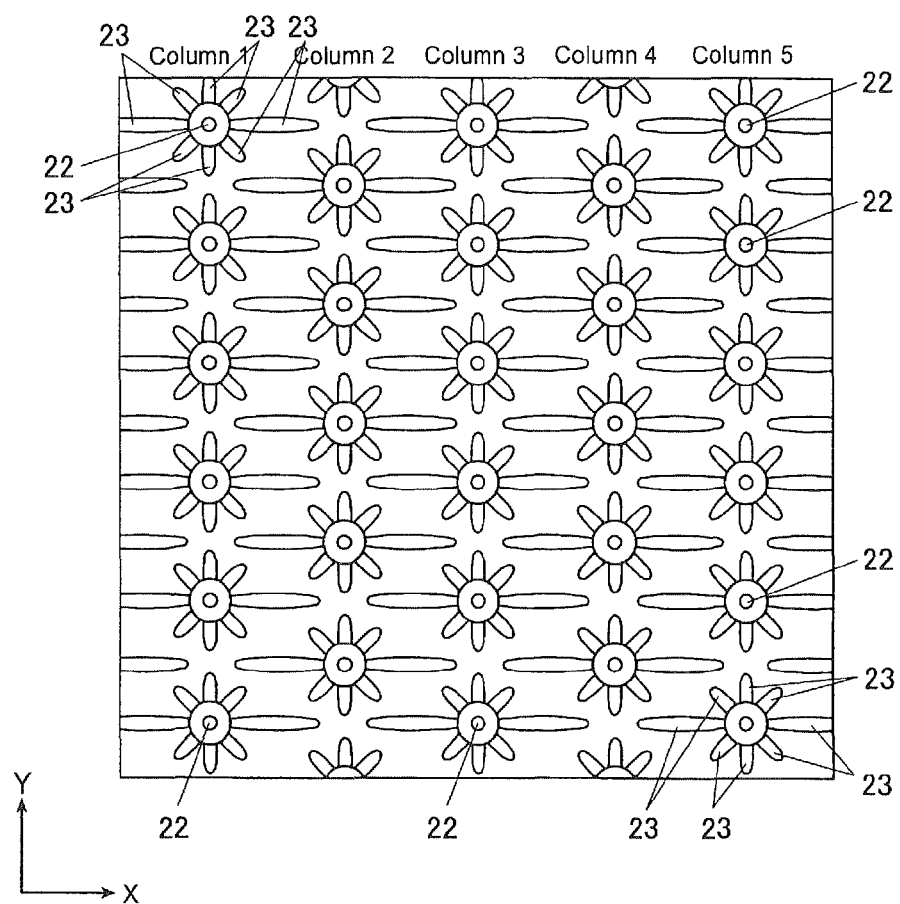
FIG. 2 is a schematic front view showing a configuration of a large number of projections and grooves according to this embodiment.

FIG. 2 is a schematic front view showing a configuration of the large number of projections 22. FIG. 2 shows a part of the large number of projections 22 constituted by five columns, for example. Here, corresponding projections 22 in odd-numbered columns are disposed in positions having identical Y coordinates. The projections 22 in even-numbered columns, meanwhile, are disposed in substantially intermediate locations between the projections 22 to the front and rear thereof in the odd-numbered columns. Thus, no projections 22 are disposed to the sides of any of the other projections 22 in an X direction, and as a result, spatial leeway is obtained.

A plurality of grooves 23 is formed around each projection 22 to extend radially from a center of the projection 22. The plurality of grooves 23 is formed at substantially 45-degree angular intervals. As described above, more spatial leeway is available on the sides of the projections 22 in the X direction than in other directions, and therefore, of the plurality of grooves 23, the grooves 23 parallel to the X direction are formed to be longer than the other grooves 23.

Here, the projections 22 and the grooves 23 are formed by emitting a high energy density beam such as a laser beam or an electron beam onto a surface of the metal portion 2. More specifically, first, a high energy density beam is emitted onto the surface of the metal portion 2 rectilinearly from a planned central position of the projection 22 to a planned tip end position of the groove 23. As a result, the groove 23 is formed, while molten metal generated when forming the groove 23 is caused to project on an opposite side to an advancement direction of the high energy density beam, or in other words in the planned central position of the projection 22. By repeating this process for each groove 23, the projection 22 is formed at a predetermined height.

As shown in FIG. 1, the resin portion 3 is provided integrally with the metal portion 2 to cover the upper surface and the lower surface of the end portion 21 of the metal portion 2. The upper surface and the lower surface of the end portion 21 of the metal portion 2 constitute a joint surface of the metallic material, which serves as part of a joint surface between the fiber reinforced plastic and the metallic material according to the present invention.

To form the resin portion 3, a plurality of sheets of fiber reinforced plastic is laminated successively onto the end portion 21 of the metal portion 2, which includes the stepped structure, in a prepreg condition obtained by impregnating reinforcing fibers with a matrix resin. For convenience, the plurality of sheets of fiber reinforced plastic are divided into parts corresponding to respective steps on the end portion 21 of the metal portion 2. Thermosetting is then applied to the plurality of fiber reinforced plastics such that the metal portion 2 and the plurality of fiber reinforced plastics is adhered to each other and the respective fiber reinforced plastics are integrated to form the resin portion 3. Further, during the thermosetting, molten resin infiltrates the projections 22 and the grooves 23.

Figure 3:
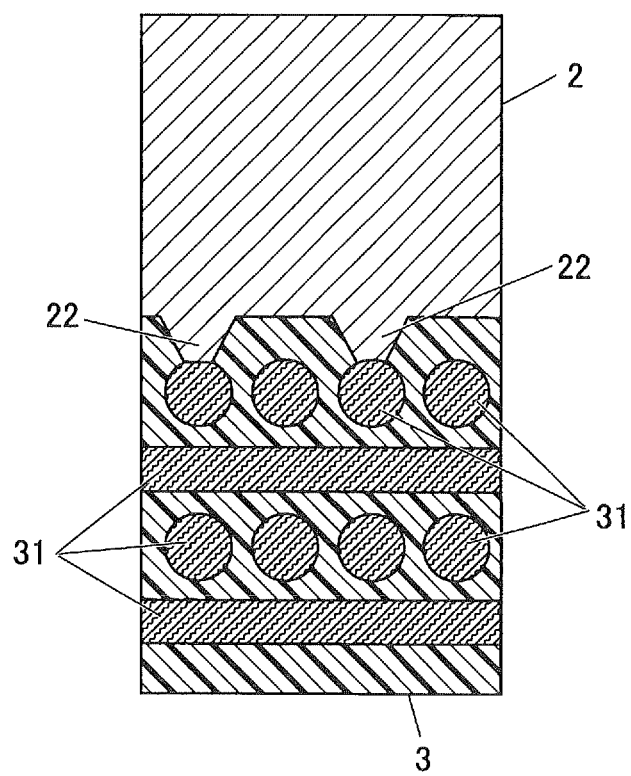
FIG. 3 is a sectional view showing an enlargement of a rectangular S part of FIG. 1.

FIG. 3 is a sectional view showing an enlargement of a rectangular S part of FIG. 1. As shown in FIG. 3, the height of the projection 22 is set so that the projections 22 contact reinforcing fibers (fibers) 31 in the resin portion 3. Note that FIG. 3 shows a case in which the reinforcing fibers 31 of the resin portion 3 are laminated such that extension directions of the fibers are orthogonal to each other in the thickness direction. However, there are no limitations on the arrangement of the reinforcing fibers 31.

According to this embodiment, as described above, the large number of projections 22 of a predetermined height are formed on the joint surface of the metal portion 2, and therefore a conductivity can be increased in comparison with a case where the projections 22 are not provided. In particular, when the height of the projections 22 is set to be equal to or greater than a height enabling the projections 22 to contact the reinforcing fibers 31 constituting the resin portion 3, an equivalent conductivity to that of a fastener joint can be achieved. Hence, an equivalent conductivity to that of a fastener joint can be secured without the use of a fastening tool.

Figure 4:
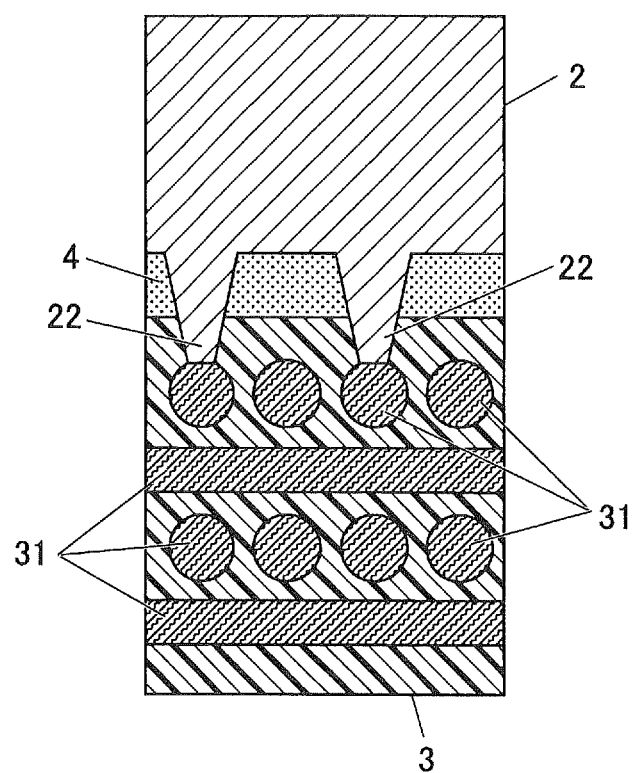
FIG. 4 is a sectional view showing a modified example of FIG. 3.

As described above, to obtain at least an equivalent conductivity to that of a fastener joint, the projections 22 must contact the reinforcing fibers 31. Therefore, when an adhesive layer 4 is interposed between the metal portion 2 and the resin portion 3, as shown in FIG. 4, for example, the height of the projections 22 is preferably set in consideration of a thickness of the adhesive layer 4. For example, when the adhesive layer 4 interposed between the metal portion 2 and the resin portion 3 has a thickness of 0.2 to 0.25 mm, a conductivity that is equivalent to or greater than that of a fastener joint can be obtained by forming the projections 22 at a height of at least 0.3 mm, taking into consideration not only the thickness of the adhesive layer 4 but also a thickness of resin on the outside of the reinforcing fibers 31.

As described above, the projections 22 are formed by forming the grooves 23 using a high energy density beam such as a laser beam or an electron beam, whereby the resulting molten metal is caused to project. The height of the projection 22 increases together with a length of the groove 23 up to a saturation point, and therefore, to increase the height of the projection 22, an overall length of the plurality of grooves 23 must be increased. Hence, in this embodiment, the projections 22 are disposed in the arrangement described above so that the grooves 23 parallel to the X direction are formed at a greater length than the other grooves 23.

Note that the present invention is not limited to the above embodiment and may be modified appropriately.

Figure 5:
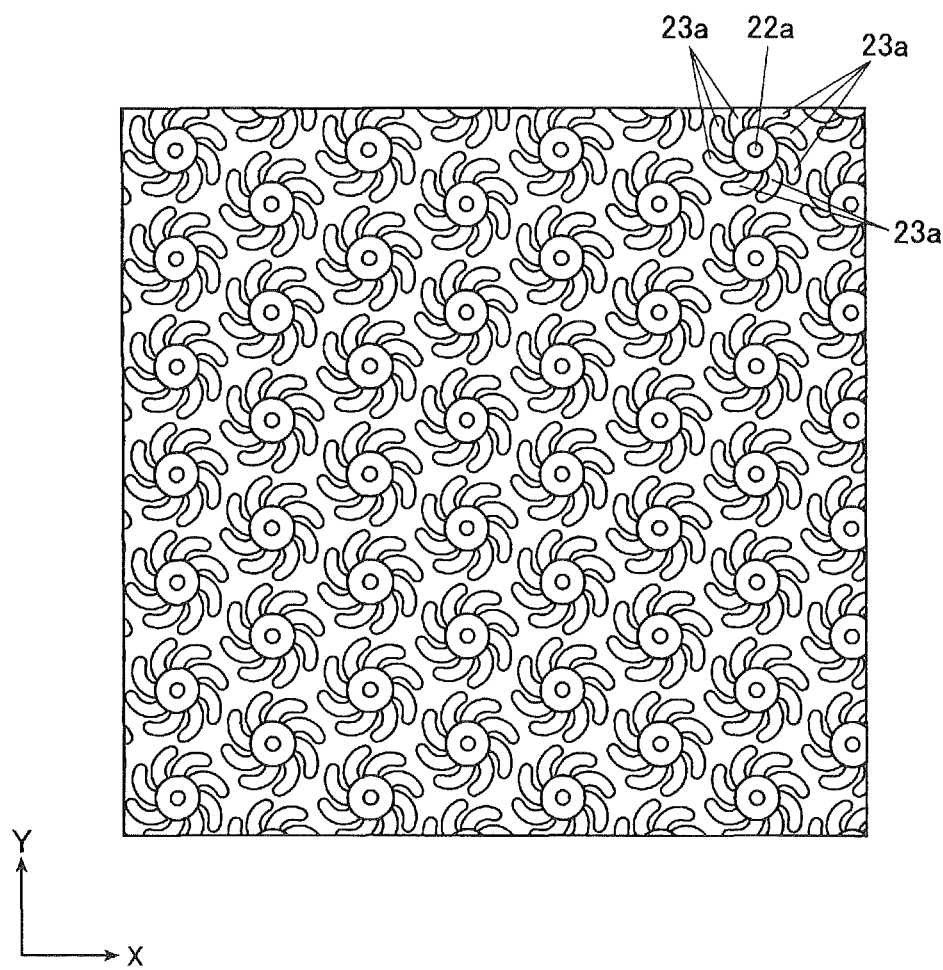
FIG. 5 is a front view showing a modified example of the grooves shown in FIG. 2.
Figure 6:
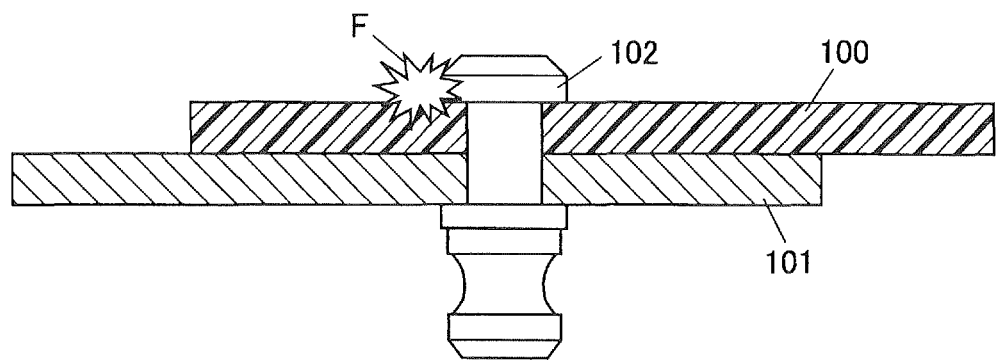
FIG. 6 is a sectional view showing a conventional joint structure for a fiber reinforced plastic and a metal.

For example, in the above embodiment, the rectilinear grooves 23 are described as an example, but curved grooves may be formed instead. As shown in FIG. 5, for example, a plurality of grooves 23a extending radially from a center of a projection 22a is preferably caused to curve in an identical direction. More specifically, FIG. 5 shows a case in which respective tip ends of the plurality of grooves 23a curve in a clockwise direction from base ends thereof. Grooves curving in a counter-clockwise direction may of course also be used. By forming the grooves 23a in this manner, the overall length of the plurality of grooves 23a can be increased while reducing a surface area occupied by the plurality of grooves 23. Accordingly, the projections 22a can be disposed at a higher density, and as a result, the conductivity between the resin portion 3 and the metal portion 2 can be increased efficiently.

A composite material including conductive fibers, such as carbon fiber reinforced plastic, may be used as the applied fiber reinforced plastic.

A Ti alloy, an Al alloy, an Mg alloy, and so on may be used as a material of the applied metallic material. However, any type of metallic material may be used. Further, any type of thermosetting resin may be used as the applied resin.

What is claimed is:
1. A joint structure, comprising:
  a fiber reinforced plastic comprising a resin and fibers embedded in the resin; and
  a metallic material, respective end portions of the fiber reinforced plastic and the metallic material being joined to each other,
  wherein the metallic material comprises a joint surface between the fiber reinforced plastic and the metallic material, the joint surface comprising a plurality of projections having a height that enables the projections to contact the fibers of the fiber reinforced plastic, and
  wherein the fibers include:
    a first set of equally spaced parallel fibers; and
    a second set of equally spaced parallel fibers,
  wherein the first set of fibers is in contact with the projections and is perpendicular to the second set of fibers,
  wherein the second set of fibers is spaced from the projections and the first set of fibers, and
  wherein a direction of a protrusion of the projections from the metallic material is perpendicular to each of the first and second sets of fibers.
2. The joint structure according to claim 1, wherein a plurality of grooves is formed around each of the projections to extend radially from a center of each of the projections, and wherein the plurality of grooves curves in an identical direction.

3. The joint structure according to claim 1, wherein a width of each of the projections decreases as said each of the projections projects from the metallic material to terminate at the first set of fibers.

4. The joint structure according to claim 1, wherein the projections end at a surface of the first set of fibers.

5. The joint structure according to claim 4, wherein, in the direction of the protrusion of the projections from the metallic material, the resin in the fiber reinforced plastic is disposed on an upper surface of the second set of fibers.

6. The joint structure according to claim 5, wherein, in the direction of the protrusion of the projections from the metallic material, each fiber of the first set of fibers is disposed above the second set of fiber, the resin being disposed on the surface of the first set of fibers.

7. The joint structure according to claim 1, wherein an entirety of the second set of fibers is spaced apart from the projections and the first set of fibers.

8. The joint structure according to claim 1, wherein the resin is disposed between the second set of fibers and the projections.

9. The joint structure according to claim 8, wherein the resin is further disposed between the second set of fibers and the first set of fibers.

10. A joint structure, comprising:
    a fiber reinforced plastic comprising a resin and fibers embedded in the resin; and
    a metallic material comprising a joint surface between the fiber reinforced plastic and the metallic material, the joint surface comprising a plurality of projections having a height that enables the projections to contact the fibers of the fiber reinforced plastic,
    wherein the fibers include:
        a first set of equally spaced parallel fibers; and
        a second set of equally spaced parallel fibers,
    wherein the first set of fibers is in contact with the projections and is perpendicular to the second set of fibers,
    wherein the second set of fibers is spaced from the projections and the first set of fiber, and
    wherein a direction of a protrusion of the projections from the metallic material is perpendicular to each of the first and second sets of fibers, and
    wherein the metallic material comprises:
        a first portion that is in contact with the fiber reinforced plastic at a side surface of the first portion; and
        a second portion protruding from the first portion into the fiber reinforced plastic in a direction orthogonal to the direction of the protrusion of the projections from the metallic material.

11. The joint structure according to claim 10, wherein the first portion is devoid of the projections, and
    wherein, in the direction of the protrusion of the projections from the metallic material, the projections protrude from a bottom surface of the second portion.

12. The joint structure according to claim 11, wherein the metallic material further comprises:
    a third portion protruding from the second portion into the fiber reinforced plastic in the direction orthogonal to the direction of the protrusion of the projections from the metallic material.

13. The joint structure according to claim 12, wherein, in the direction of the protrusion of the projections from the metallic material, the projections protrude from a bottom surface of the third portion.

14. The joint structure according to claim 13, wherein, in the direction of the protrusion of the projections from the metallic material, a thickness of the metallic material decreases as the metallic material extends from the first portion to the second portion, and extends from the second portion to the third portion.

15. The joint structure according to claim 14, wherein, in the direction of the protrusion of the projections from the metallic material, a thickness of the fiber reinforced plastic increases as the fiber reinforced plastic extends from above the second portion to above the third portion.

* * * * *